United States Patent
Hori et al.

(10) Patent No.: US 10,544,668 B2
(45) Date of Patent: Jan. 28, 2020

(54) SYSTEM AND METHODOLOGY FOR ACOUSTIC MEASUREMENT DRIVEN GEO-STEERING

(71) Applicant: Schlumberger Technology Corporation, Sugar Land, TX (US)

(72) Inventors: Hiroshi Hori, Kanagawa-ken (JP); Takeshi Endo, Kanagawa-ken (JP); Evgeniya Deger, Kanagawa-ken (JP); Naoki Sakiyama, Tokyo (JP); Hiroshi Nakajima, Kanagawa-ken (JP); Jean-Christophe Auchere, Sagamihara (JP); Henri-Pierre Valero, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 336 days.

(21) Appl. No.: 15/581,538

(22) Filed: Apr. 28, 2017

(65) Prior Publication Data
US 2017/0314385 A1    Nov. 2, 2017

Related U.S. Application Data

(60) Provisional application No. 62/328,619, filed on Apr. 28, 2016.

(51) Int. Cl.
*E21B 47/08* (2012.01)
*G01V 1/46* (2006.01)
(Continued)

(52) U.S. Cl.
CPC ...... *E21B 47/02208* (2013.01); *E21B 47/024* (2013.01); *E21B 47/082* (2013.01);
(Continued)

(58) Field of Classification Search
CPC .. E21B 47/091; E21B 17/20; E21B 47/02208; E21B 47/12; E21B 47/024;
(Continued)

(56) References Cited

U.S. PATENT DOCUMENTS

| 3,102,251 A | 8/1963 | Blizard |
| 3,508,438 A | 4/1970 | Alger |

(Continued)

FOREIGN PATENT DOCUMENTS

| EP | 1348954 A1 | 10/2003 |
| EP | 3147449 A1 | 3/2017 |

OTHER PUBLICATIONS

Leslie et al., Sonic waveforms analysis: Applications, Paper GG presented at the 23rd SPWLA Logging Symposium, Corpus Christi, Texas Jun. 1982. 25 pages.
(Continued)

*Primary Examiner* — Daniel L Murphy

(57) ABSTRACT

A technique facilitates use of acoustic measurements to enable geo-steering during a well operation. A steerable well string is provided with acoustic systems used to collect data which is then processed to determine geo-steering inputs. In some applications, the well string may comprise a coiled tubing drilling tool. The coiled tubing drilling tool or other well string tool is combined with an azimuthally distributed pitch-catch micro-sonic sensor system and an azimuthally distributed ultrasonic pulse-echo transducer system. Data from these two systems is provided to a processing system which processes the data to determine, for example, real-time, geo-steering inputs. These inputs may then be used to more effectively steer the coiled tubing drilling tool or other well string tool.

20 Claims, 13 Drawing Sheets

(51) Int. Cl.
    *G01V 1/50*     (2006.01)
    *G01V 11/00*     (2006.01)
    *E21B 47/022*     (2012.01)
    *E21B 47/024*     (2006.01)
    *E21B 47/12*     (2012.01)

(52) U.S. Cl.
    CPC ............ *E21B 47/12* (2013.01); *G01V 1/46* (2013.01); *G01V 1/50* (2013.01); *G01V 11/002* (2013.01); *G01V 2200/16* (2013.01)

(58) Field of Classification Search
    CPC .......... E21B 47/082; G01V 1/46; G01V 1/50; G01V 11/002; G01V 2210/72; G01V 2200/16
    USPC ........................................................ 367/25
    See application file for complete search history.

(56) References Cited

U.S. PATENT DOCUMENTS

| | | | |
|---|---|---|---|
| 5,354,956 | A | 10/1994 | Orban et al. |
| 6,397,946 | B1 * | 6/2002 | Vail, III ............... E21B 7/20 166/250.01 |
| 6,678,616 | B1 | 1/2004 | Winkler et al. |
| 7,036,363 | B2 * | 5/2006 | Yogeswaren ......... B06B 1/0622 73/152.16 |
| 7,513,147 | B2 | 4/2009 | Yogeswaren |
| 7,913,806 | B2 | 3/2011 | Pabon et al. |
| 8,960,330 | B2 | 2/2015 | Leising et al. |
| 2014/0177388 | A1 | 6/2014 | Dangelo |
| 2015/0168580 | A1 | 6/2015 | Prioul et al. |
| 2015/0234069 | A1 | 8/2015 | Ramakrishnan et al. |

OTHER PUBLICATIONS

Brie et al, Shear Sonic Interpretation in Gas-Bearing Sands, SPE Annual Technical Conference & Exhibition, Dallas, Oct. 22-25, 1995, SPE 30595. 10 pages.
Ramer et al., An improved sonic transit time-to-porosity transform, SWPLA 21st Annual Logging Symposium, Jul. 8-11, 1980. 13 pages.
Sayers, C.M., Ultrasonic velocity dispersion in porous materials, Journal of Physics D: Applied Physics vol. 14 (1981) pp. 413-420, UK.
Winkler, K. Frequency Dependent Ultrasonic Properties of High-Porosity Sandstones, Journal of Geophysical Research,vol. 88, No. B11, pp. 9493, 1983 Nov. 10, 1983.
Bize-Forest et al., Vug Porosity Estimation using Acoustic Images in Oil or Water-based Mud Systems, Paper 8G09, EAGE, Dubai, UAE. Oct. 12-15, 2014. 3 pages.
Plona et al., Measurement of Stress Direction and Mechanical Damage Around Stressed Boreholes Using Dipole and Microsonic Techniques. Society of Petroleum Engineers. SPE/ISRM 47234. Jul. 8-10, 1998, Trondheim, Norway.
Yamamoto et al., Fracture Imaging From Sonic Reflections and Mode Conversion. Society of Exploration Geophysicists. Jan. 1999. 4 pages.
Dac et al., Fracture Characterization in Basement Using the Latest Generation of LWD Sonic and Resistivity Image Logs. Offshore Technology Conference. Kuala Lumpur, Malaysia. Mar. 22-25, 2016. 10 pages.
Winkler, Kenneth. "Borehole damage indicator from stress-induced velocity variations." Geophysics. vol. 70, No. 1 pp. F11-F16. Jan.-Feb. 2005.
Winkler et al., Ultrasonic borehole velocity imaging. Geophysics. vol. 71, No. 3, pp. F25-F30. May-Jun. 2006.

* cited by examiner

SYSTEM AND METHODOLOGY FOR ACOUSTIC MEASUREMENT DRIVEN GEO-STEERING

CROSS-REFERENCE TO RELATED APPLICATION

The present document is based on and claims priority to U.S. Provisional Application Ser. No. 62/328,619, filed Apr. 28, 2016, which is incorporated herein by reference in its entirety.

BACKGROUND

Since the 1960s, sonic well logging techniques have been used in oil and gas exploration. Some techniques apply downhole sonic measurements to estimate formation porosity based on acoustic wave propagation velocity. Such methods may employ directional measurements performed at various frequency ranges from audible sonic to ultrasonic frequencies. According to these methods, acoustic sensors are arranged to obtain data regarding porosity estimations during wireline and logging-while-drilling applications. Sonic techniques also have used acoustic signals to determine a variety of other formation characteristics.

SUMMARY

In general, the present disclosure provides a system and methodology which utilize acoustic measurements to enable geo-steering during a well operation. A steerable well string is provided with acoustic systems used to collect data which is then processed to determine geo-steering inputs. In some applications, the well string may comprise a coiled tubing drilling tool. The coiled tubing drilling tool or other well string tool is combined with an azimuthally distributed pitch-catch micro-sonic sensor system and an azimuthally distributed ultrasonic pulse-echo transducer system. Data from these two systems is provided to a processing system which processes the data to determine, for example, real-time geo-steering inputs. These inputs may then be used to more effectively steer the coiled tubing drilling tool or other well string tool.

BRIEF DESCRIPTION OF THE DRAWINGS

Certain embodiments will hereafter be described with reference to the accompanying drawings, wherein like reference numerals denote like elements. It should be understood, however, that the accompanying figures illustrate various implementations described herein and are not meant to limit the scope of various technologies described herein, and.

DETAILED DESCRIPTION

Figure 1:
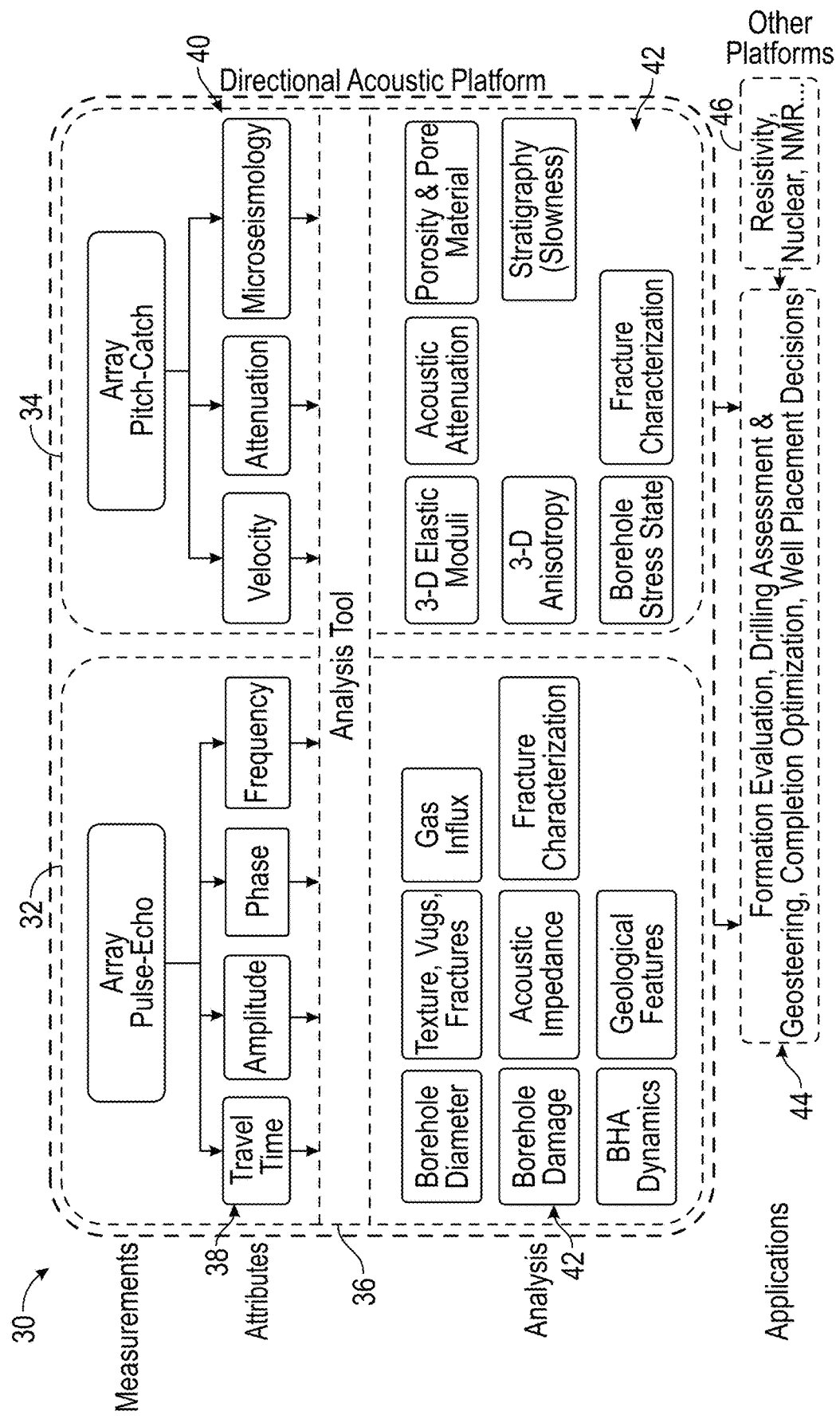
FIG. 1 is a schematic illustration of an acoustic platform that provides array pulse-echo and pitch-catch measurements for formation evaluation and drilling assessment, according to an embodiment of the disclosure.

In the following description, numerous details are set forth to provide an understanding of some illustrative embodiments of the present disclosure. However, it will be understood by those of ordinary skill in the art that the system and/or methodology may be practiced without these details and that numerous variations or modifications from the described embodiments may be possible.

The disclosure herein generally relates to a system and methodology which facilitate and improve data acquisition and analysis from operations utilizing downhole tools and systems. According to an embodiment, the system and methodology involve obtaining and analyzing acoustic measurements to enable geo-steering during a well operation. In this embodiment, a steerable well string is provided with acoustic systems used to collect data which is then processed to determine geo-steering inputs. In some applications, the well string may comprise a coiled tubing drilling (CTD) tool. The coiled tubing drilling tool or other well string tool may be combined with an azimuthally distributed pitch-catch micro-sonic sensor system and an azimuthally distributed ultrasonic pulse-echo transducer system. Data from these two systems is provided to a processing system which processes the data to determine, for example, real-time, geo-steering inputs. These inputs may then be used to more effectively steer the CTD tool or other well string tool.

Depending on the embodiment, downhole tools and systems may utilize arrays of sensing devices configured for easy attachment and detachment in downhole sensor tools. The downhole sensor tools may be deployed to sense data related to environmental and/or tool parameters at downhole locations within a borehole. Additionally, the downhole sensor tools may comprise or work in cooperation with systems to effectively enable sensing and storing of characteristics related to components of downhole tools, formation parameters, and/or other desired characteristics. For example, the downhole sensor tools may be used to obtain data on various formation parameters at downhole locations subject to elevated temperatures and pressures.

The downhole sensor tools may be incorporated into tool systems such as wireline logging tools, measurement-while-drilling tools, logging-while-drilling tools, permanent monitoring systems, drill bits, drill collars, sondes, and other downhole tool systems. The tool systems may be deployed downhole into a borehole via a suitable conveyance such as wireline, cable line, slick line or coiled tubing. For example, coiled tubing may be used to deploy a CTD tool combined with the corresponding downhole sensor tools.

Coiled tubing drilling is a drilling technique which deploys a steerable mud motor drill attached to the end of a thin-wall tubing together with a bent sub. Coiled tubing drilling tools may be employed in a variety of drilling applications and can be used to facilitate re-entry into an unconventional reservoir through multilateral wells by traveling through tubing of oil/gas producing wells. A CTD tool is an example of the type of tool which may be combined with sensor systems disclosed herein to obtain acoustic measurements which may then be used to enable geo-steering. For example, the CTD tool may be used in a logging-while-drilling (LWD) operation while combined with a sensor system for obtaining acoustic measurements which enable the geo-steering.

An example of such as sensor system comprises azimuthally distributed pitch-catch micro-sonic sensors for determining slowness of acoustic wave propagation. The pitch-catch sensors may include at least one transmitter and an array of receivers and both the transmitter and the receivers may be positioned at the surface of a corresponding downhole tool, e.g. at the surface of a CTD tool proximate to the motor drill sub. The sensor system may further comprise azimuthally distributed ultrasonic pulse-echo transducers to determine, for example, borehole surface images and borehole diameter measurements. The data obtained from both the pitch-catch micro-sonic sensors and the ultrasonic pulse-echo transducers may be used to determine real-time geo-steering inputs to enable steering of the drill string.

Embodiments of the sensor system may be used to obtain and provide in-situ and/or real-time borehole imaging and information on formation elastic properties, including physical parameters derived from them, e.g. porosity. The embodiments also may be used to obtain slowness measurements at different azimuths in a wide frequency range, e.g. from 20 kHz to 1 MHz. The acoustic signal slowness measurements are useful for drilling assessments and formation evaluation as well as for logging-while-drilling purposes during oil and gas exploration.

The sensor systems described herein may comprise multiple sensors distributed azimuthally and such systems are useful in, for example, applications in which downhole logging tools are not rotating or are rotating slowly. The sensor systems may be used in many types of applications including coiled tubing drilling applications having logging-while-drilling bottom hole assemblies. Other applications may utilize such sensor systems in standard logging-while-drilling applications using a motor drill or in applications involving wireline logging. Embodiments of sensor systems described herein may be used with rotating bottom hole assemblies and various other types of systems for many types of formation evaluation, including petro-physical, geo-mechanical and geological aspects, porosity evaluation, elastic moduli, intrinsic and stress-induced anisotropy, borehole stress states/stability and their time-lapsed changes, formation texture, vugs, fractures, and/or other formation characteristics.

Embodiments described herein also may be useful in conventional LWD and wireline logging for purposes of formation evaluation. When obtaining LWD measurements, acoustic measurements obtained by the sensor system may be combined with resistivity, density, porosity, pore fluid characterization, or other data used in commercial oil well logging. To help explain details of embodiments described herein, a system and methodology are described in detail for use in a LWD coiled tubing drilling operation. However, the sensor systems described herein may be combined with other types of downhole tools for use in other environments and applications and should not be limited to LWD applications.

According to embodiments of the system, azimuthally (and axially) distributed acoustic pitch-catch and pulse-echo sensors may be used to obtain three-dimensional measurements for nonrotating LWD bottom hole assemblies and wireline logging. The data obtained from the sensors can be used in three-dimensional formation evaluation and real-time drilling decisions. For example, the data obtained may be used to enable geo-steering of the CTD tool string or other downhole tool string. The geo-steering is enabled by utilizing directional acoustic wave propagation velocity measurements (which may be referred to as micro-sonic or sonic) taken together with pulse-echo imaging. The pulse-echo imaging is able to indicate azimuthal porosity variation of a formation through formation texture analysis, e.g. analysis of porosity and fractures.

Micro-sonic measurements provide acoustic wave propagation slowness (the reciprocal of velocity) that varies as a function of porosity. Reservoir formations often have known properties such as matrix rock type and fluid in pores/vugs. Acoustic wave propagation slowness may be determined as a function of matrix rock density and compressional and shear wave velocities. The acoustic wave propagation slowness also may be determined as a function of porosity and material in the pore space of the formation rock.

Matrix rock properties and materials in pores/vugs can be obtained based on analysis of existing geological data or well exploration through pilot holes. Providing a well steering trajectory in a target formation, or through the sub layers of the formation, can be simplified by navigating the tool in target slowness. Micro-sonic measurements of compressional and shear wave propagation slowness can be used to further narrow the type of rock formation. Visualization of waveforms can also indicate mode conversions, e.g. from acoustic P waves to S waves or S waves to P waves, and reduction of wave amplitude due to reflection/transmission which can be caused by discontinuity in the formation layers indicating possible layer boundaries and/or fractures.

Pulse-echo measurements may be used, for example, for borehole diameter measurements, fractures, and vugs characterization. Embodiments described herein may utilize pulse-echo amplitude profile changes as an indicator of changes in formation types and properties. The changes in formation types and properties may indicate: reservoir rock types (e.g. sandstone, shale, limestone) that tend to present borehole features specific to their type; brittleness differences caused by diagenesis of microscopic grains, pores and vugs in various forms and fractures specific to reservoir rock that may further vary surface textures; and acoustic impedance (which is the product of formation density and P-wave velocity). The acoustic impedance changes with changes in the reflectivity of formation rock. The characterization of pores/vugs from amplitude distribution in carbonate formations is described in, for example, US patent publication US 2015/0234069.

Combining micro-sonic acoustic slowness and pulse-echo reflectivity measurements can be used in obtaining a better identification of formation rock properties useful in determining steering inputs for geo-steering. The micro-sonic acoustic slowness measurements may be achieved with depth resolution, e.g. typically within a few inches due to a relatively small receiver aperture.

Some embodiments involve building a library of data from corresponding wells that also can be used to facilitate geo-steering. For example, local libraries may be used to store data related to slowness and pulse-echo images/textures; sonic compressional and shear slowness; neutron density/porosity; and magnetic resonance. This data may be used to identify materials in pores/vugs from pilot wells and neighboring wells to further aid in geo-steering the well string, e.g. coiled tubing drilling string, thus facilitating locating of the borehole to enhance efficient hydrocarbon production.

Referring generally to FIG. 1, an embodiment of a downhole sensor system 30 is illustrated as comprising a sensor array system 32 of pulse-echo sensors and a sensor array system 34 of pitch-catch sensors. By way of example, the downhole sensor system 30 may be in the form of an acoustic logging while drilling (LWD) tool. In some embodiments, the sensor array system 32 is in the form of an azimuthally distributed ultrasonic pulse-echo transducer system and the sensor array system 34 is in the form of an azimuthally distributed pitch-catch micro-sonic sensor system as described in greater detail below. Sensor data obtained by sensor system 32 and sensor system 34 may be provided to an analysis tool 36, e.g. a processor-based analysis tool. The analysis tool 36 may be positioned downhole during a data collection operation or at another suitable location such as a surface location. In some applications, the analysis tool 36 is a processor-based tool configured to process data received from sensor systems 32, 34 and may be located partially downhole and partially at the surface. The sensors of pulse-echo sensor array system 32 and of pitch-catch sensor array system 34 are able to provide formation evaluation and drilling parameter data which can be processed via analysis tool 36 to enable geo-steering inputs for a coiled tubing drilling tool or other suitable tool of a steerable well string. The downhole sensor system 30 is useful even if the bottom hole assembly is not rotated downhole.

Data from the array 32 of pulse-echo sensors may be used to detect various attributes 38 related to acoustic signals. By way of example, the sensor array system 32 of pulse-echo sensors may be used to determine attributes such as signal travel time, amplitude, phase, and frequency. Similarly, the sensor array system 34 of pitch-catch sensors may be used to determine acoustic signal attributes 40 such as directional velocity of the formation in the vicinity of a borehole (of which the depth-of-investigation may vary as a function of frequency or acoustic wavelength), signal attenuation, and microseismology. As described in greater detail below, each pitch-catch sensor of sensor array system 34 may comprise at least one transmitter working in cooperation with a plurality of receivers to obtain the desired data.

Extracted attributes 38, 40 may then be input to analysis tool 36 to enable automated or interactive formation evaluation and drilling assessment/geo-steering inputs. In some embodiments, the analysis tool 36 may be in the form of a controller module which processes acoustic signals and extracts there attributes 38, 40. The controller module/tool 36 also may be used to store and transmit the data regarding attributes 38, 40. For example, the controller module/tool 36 may comprise a modem module to transmit acoustic data to a telemetry module (see telemetry module described below with reference to FIG. 3). The attributes 38, 40 may be used to determine many types of characteristics 42 related to the formation, borehole, production fluids, drilling equipment, or other aspects of a given operation. The characteristics 42, in turn, may be useful in facilitating many types of applications 44, such as formation evaluation, drilling assessment and geo-steering, completion optimization, well placement decisions, or other applications. Additional information 46 obtained from libraries or from data provided by other sensor platforms (e.g. resistivity sensor systems, nuclear sensor systems, or other types of platforms) also may be processed to optimize a given application 44, e.g. a geo-steering application.

Depending on the embodiment, specific attributes 38 may be processed via analysis tool 36 to determine many types of characteristics 42. For example, the signal travel time attribute may be used to obtain borehole diameter, borehole damage from shape change, and tool position in the borehole. Diameter changes and damage often are caused during drilling so real-time data enables an improved assessment of drilling parameters through analysis of real-time feedback regarding borehole stability data. Borehole amplitude images indicate reflectivity changes as a function of borehole orientation/depth and this may indicate formation type change via texture data, acoustic impedance/elastic property change, and/or the presence of formation dependent features, e.g. stylolite and sand injectite, which can be useful for geological stratigraphic analysis.

The attributes 38 of phase and frequency also can be useful. For example, the phase of the acoustic signal echo changes as a function of the reflector material type, e.g. solid or gas, so that the phase of the signal is able to indicate gas influx and bubbling point (see example illustrated in FIG. 8). Additionally, frequency is highly sensitive to tiny borehole surface events, e.g. hairline fractures. The frequency attribute also may be useful in identification of cutting reflection which tends to have higher frequency components. Cutting indications are useful with respect to quality control which may involve cutting flow while drilling.

Additionally, directional slowness of the acoustic signal may indicate a three-dimensional elastic property variation of a formation. The variation may result from intrinsic anisotropy, stress-effect, porosity and alteration, and/or formation dip. Combining the acoustic platform of sensor system 30 with other measurement information 46, e.g. resistivity, density, nuclear magnetic resonance data, can improve the overall capability of formation evaluation and drilling. Acquired data may be input into an analysis and visualization tool, thus enabling either automated or interactive interpretation and decision-making.

Figure 2:
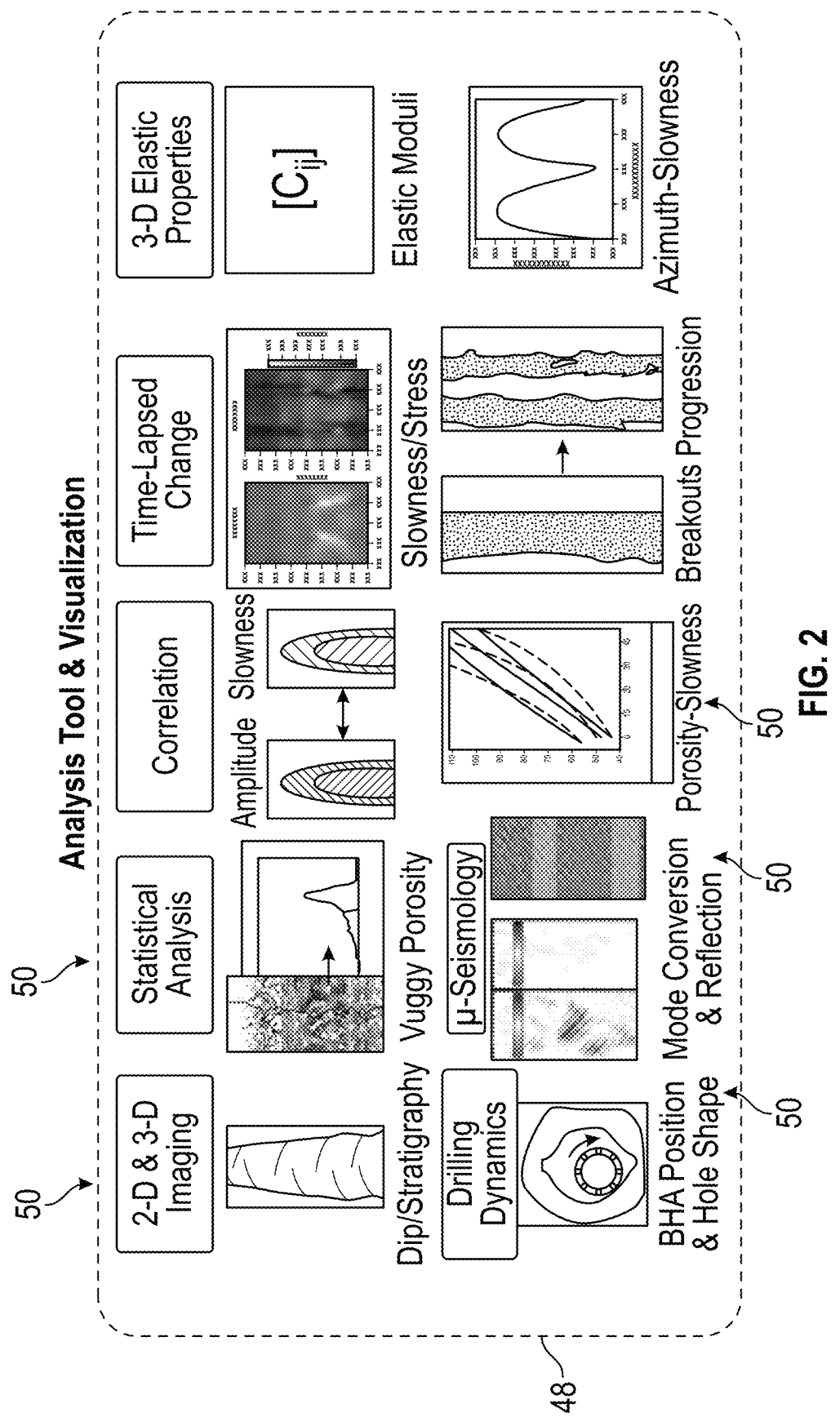
FIG. 2 is a schematic illustration of an attribute analysis and visualization tool, according to an embodiment of the disclosure.

Referring generally to FIG. 2, an embodiment of an analysis and visualization tool 48 is illustrated schematically. The analysis and visualization tool 48 may be a processor-based, e.g. computer-based, tool for processing data. In some embodiments, the analysis and visualization tool 48 may be part of an overall analysis tool 36 and/or separate surface processing system. Embodiments of an analysis and visualization tool 48 may provide a variety of desired functions 50. Examples of such functions 50 include image rendering, statistical analysis, acoustic or multi-physics measurements correlation (e.g. amplitude and slowness correlation), time-lapse changes, and calculation of material properties. The corresponding data may be stored in a database, e.g. a formation database which can be built locally and updated using learning functions. As illustrated in FIG. 2, the analysis and visualization tool 48 may utilize a variety of images which may be stored. In some embodiments, two dimensional (2-D) or three-dimensional (3-D) imaging may be available. Such imaging may combine borehole diameter and pulse-echo amplitude (or azimuthal slowness) which are useful directional measurements in azimuthal and depth directions.

In some embodiments, the downhole sensor system 30, along with analysis and visualization tool 48, may be used to estimate borehole shape and tool position from transit time data sampled at a sufficiently fine time interval relative to the tool or BHA motion in the borehole. This type of analysis is useful in understanding BHA dynamic motion in the borehole. For example, BHA rattling, resonance of drill pipes, stick and slip motion, or slip and slip motion can be observed in a reasonably comprehensive manner for use by drilling operators.

The downhole sensor system 30 may be operated to obtain different acoustic measurements at a large number of azimuth/depth bins. The measurement data can be processed statistically to improve the reliability of high-frequency measurements that can be easily affected by relatively small geometrical changes. Correlating statistically processed/reliable data acquired by directional measurements is useful in understanding both formation and borehole properties. Comparisons of post-echo amplitude images (based on data from sensor array system 32) verses pitch-catch slowness images (based on data from sensor array system 34) enable the determination/detection of differences in mechanical properties, e.g. velocity, and surface geometry affects, e.g. reflectivity changes affected by both acoustic impedance and surface rugosity. Acoustic measurements may be correlated to data from other platforms 46 dedicated to measuring, for example, resistivity, density, and pore material so as to form a better understanding of formation and hydrocarbon reservoir characteristics.

Azimuthal slowness and time-lapsed changes in azimuthal slowness can provide borehole stress state changes for drilling operators. This allows the drilling operators to assess drilling parameters such as mud density, rate-of-penetration, and speed of pull-out-of-hole. The ability to assess these drilling parameters can be very helpful particularly in borehole sections where the hole condition is important to continuing the operation, e.g. borehole sections that are nearly failing or brittle/fragile. Raw sonic waveforms acquired at different transmitter-receiver spacing of pitch-catch measurements may be used for micro-seismology to identify fractures and to characterize them with respect to their opened/closed states. A benefit of acoustic measurements in the form of localized measurements or directional measurements (e.g. axial and/or circumferential measurements) is the ability to characterize mechanical properties as a function of azimuth and depth. Such measurements may be especially useful in highly heterogenic environments where it can be challenging to obtain borehole modes and omni-directional measurements for providing a model-based inversion.

Figure 3:
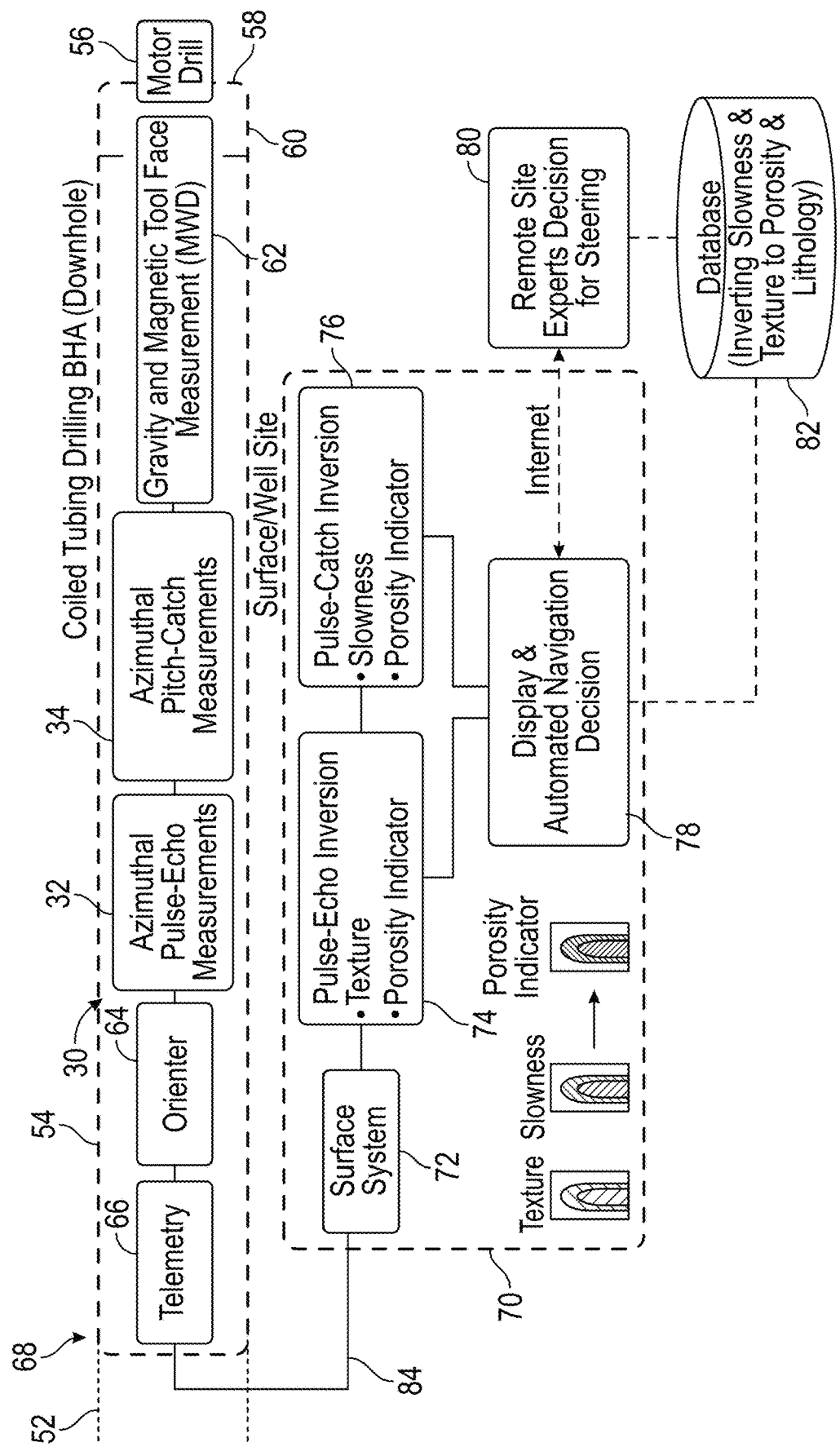
FIG. 3 is a schematic illustration of a well tool system having formation slowness and texture-based geo-steering capability for CTD/LWD applications, according to an embodiment of the disclosure.

Referring generally to FIG. 3, a schematic illustration is provided in which the downhole sensor system 30 is combined into a well string 52. By way of example, the downhole sensor system 30 may be in the form of an acoustic logging while drilling (LWD) tool. In the embodiment illustrated, the downhole sensor system/logging tool 30 has been combined with a CTD tool 54 of the well string 52 for the purpose of CTD geo-steering via integration of the CTD tool and the array-based acoustic platform provided by downhole sensor system 30. This embodiment incorporates acoustic measurements which enable geo-steering of the CTD tool 54 because of the ability to indirectly and qualitatively indicate formation porosity via slowness measurements from the sensor array system 34 of pitch-catch sensors and the sensor array system 32 of pulse-echo sensors which can obtain data for pulse-echo images. The data may be acquired at ultrasonic frequencies in a range from, for example, 20 kHz to 1 MHz. In some embodiments, transducers may be operated via suitable electronics to provide ultrasonic frequencies in a range from 20 kHz to 1 MHz. The acquired data may be processed and ultimately used to improve placement of the borehole and to thus enhance production of hydrocarbons.

The illustrated CTD tool 54 uses downhole sensor system/logging tool 30 to enable logging-while-drilling functionality. However, the CTD tool 54 may comprise a variety of additional components and features. By way of example, the CTD tool 54 comprises a steerable mud motor drill 56 which may be attached to the end of a thin-wall tubing 58 together with a bent sub 60. In some embodiments, the CTD tool 54 also may comprise a gravity and magnetic tool face measurement (MWD) sub 62. According to an embodiment, the MWD sub 62 is in the form of an MWD control module which steers the CTD tool 54 and measures system orientation by, for example, monitoring earth magnetic field and gravity. Other components may comprise an orienter 64 which may be operated based on steering data from the MWD sub 62 so as to orient the bent sub 60 and thus to select the drilling direction according to geo-steering inputs. The overall system also may comprise a telemetry module 66. The CTD tool 54 may include or be part of a bottom hole assembly (BHA) 68. It should be noted, however, the downhole sensor system 30 may be combined with various other types of bottom hole assemblies used in drilling operations or other types of operations. In some embodiments, the controller module 36 processes acoustic signals from the azimuthal pitch-catch sensor system 34 and from the azimuthal pulse-echo sensor system 32, extracts attributes 38, 40 from the acoustic signals, stores the attributes downhole, and then sends the attributes together with their acquisition time and tool orientation data to the telemetry module 66.

In the illustrated embodiment, the telemetry module 66 is coupled with a processing system 70, e.g. a computer-based processing system. The overall processing system 70 may be disposed at least partially downhole and at least partially at the surface and may comprise various processing modules, such as the analysis tool 36 and analysis and visualization tool 48 described above. In the example illustrated in FIG. 3, processing system 70 comprises a surface system 72 having a pulse-echo inversion module 74 and a pitch-catch inversion module 76 which may output data to a display and automated navigation decision module 78 which is able to display acoustic data and/or other desired data. The module

78 also may be used to automatically geo-steer the CTD tool 54 and/or to output information to a remote site 80 to facilitate expert decision-making with respect to steering. In some embodiments, the module 78 also may be used to output data to a database 82. Examples of such data include slowness inversion data, texture to porosity data, lithology data, and/or other data useful for subsequent analysis and decision-making. In this manner, the overall processing system may be used to facilitate formation evaluation at the wellsite and/or at remote locations. In some embodiments, the data may be transferred to a desired remote location via the Internet, over a computer network, or via other suitable transmission techniques.

Embodiments of the combined downhole sensor system/LWD tool 30 and processing system 70 may be used to obtain, process, output, and/or utilize azimuthal pulse-echo measurements, azimuthal pitch-catch measurements, pulse-echo inversion, pitch-catch inversion, information for display, automated navigation decisions, data to facilitate remote site expert decision-making for steering, data for storage. In a given drilling operation, the CTD tool 54 may be controlled in real-time based on the data obtained and processed via downhole acoustic sensor system 30.

Depending on the parameters of a given operation, the downhole sensor system 30 and processing system 70 may be used to obtain and process various types of data to provide geo-steering inputs, e.g. automated geo-steering inputs, and/or to provide other types of data which may be used to facilitate recovery of hydrocarbons. By way of example, downhole sensor system 30 may be used to obtain micro-sonic measurements. Micro-sonic measurements may be obtained by measuring acoustic wave propagation slowness (the reciprocal of velocity) of a formation in the vicinity of a borehole at various orientations (or azimuths). The acoustic wave propagation slowness data may be obtained via azimuthally distributed pitch-catch micro-sonic sensors of sensor array system 34. Embodiments of sensor array system 34 may comprise at least one micro-sonic sensor and in some cases four or more sensors.

With respect to the pitch-catch micro-sonic sensor array system 34, embodiments may comprise at least one, e.g. two transmitters, which excite acoustic impulses through a wide frequency band, e.g. in a range from 20 kHz to 1 MHz, to excite compressional and shear body waves in the surrounding formation. In some embodiments, the pitch-catch sensors of sensor system 34 may be operated via suitable electronics at ultrasonic frequencies between 20 kHz and 1 MHz. Additionally, sensors of the pitch-catch sensor array system 34 may comprise an array of receivers having a plurality of acoustic pressure transducers, e.g. at least four acoustic pressure transducers and sometimes at least eight acoustic pressure transducers, to receive the body waves refracted as head waves in a borehole.

These transmitter and receiver arrays may be positioned at a surface of the CTD tool 54 (or other suitable well string tool) above and proximate the motor drill sub 56 (see FIG. 12 and corresponding description below). The transmitters and receivers are positioned to enable measurement of acoustic waves propagating in the borehole surface in a direction along a borehole axis. The transmitter and receiver spacing may be determined at a suitable distance to enable reception of formation-borne body waves and surface waves at recordable amplitude and at a desired depth-of-investigation inside the formation. In some embodiments, this distance may be in the range from about 3-12 inches although distances outside of this range may be used in various embodiments.

The transmitters and receivers may be connected to dedicated electronics which drive the transmitters and receivers while being controlled by, for example, a downhole electronics and acquisition system (which may be part of analysis tool 36). By way of example, the receivers may be connected to pre-amplifiers or buffer amplifiers to enable reception of acoustic signals at a more favorable signal-to-noise ratio. The received signals may be recorded into downhole memory and at least partially transmitted to the surface system 72 via, for example, a telemetry cable 84, e.g. a CTD tool telemetry cable. By way of example, the telemetry cable 84 may be used to communicate signals from telemetry module 66 to surface system 72. In some embodiments, the telemetry cable 84 may be in the form of a wireline cable able to carry communication signals between the telemetry module 66 and surface system 72. The received acoustic signals also may be processed downhole using downhole microprocessors, e.g. processors within analysis tool 36, to determine various attributes, e.g. compressional and shear acoustic wave propagation velocity of the formation.

Additionally, a set of transmitters and receivers may be used to determine formation slowness. In some embodiments, two transmitters may be combined and operated to correct slowness readings by applying borehole compensation (BHC). The computation of acoustic wave propagation slowness may be performed at least partially downhole via, for example, analysis tool 36. However, the computation also may be performed partially or wholly at surface system 72, e.g. via pitch-catch inversion module 76. According to one embodiment, downhole software and processors in, for example, analysis tool/controller module 36 may be used to perform the data inversion.

By way of example, the inversion may be performed according to slowness-time-coherence (STC) methods to extract velocity from acoustic signals. The processed data may then be sent uphole using telemetry module 66 and telemetry cable 84. In some embodiments, the telemetry module 66 may have relatively increased data transmission rates to enable the sending of attributes useful for geo-steering in real-time. The STC methods may be employed to extract multiple peaks of slowness-coherence projection (and to extract peak slowness, coherence level, transit time of the packets that provide the peak slowness and their root-mean-square amplitude) as attributes of slowness measurements of each firing of the transmitters.

Slowness time (ST)-plane data may be stacked to improve the reliability of the slowness measurements in cases where coherence of peaks tends to be weak. Additionally, slowness data can be processed using different methods such as using first arrival detection for P-waves, instantaneous phases at different receivers, and cross-correlation of model/parameterized packets across the arrays of sensor array system 34. Furthermore, a modified Prony's method may be applicable for receiver array slowness inversions.

Consequently, acoustic slowness may be estimated in mud or drilling fluid from Scholte wave velocity, which is a high-frequency asymptote of some fluid-coupled modes guided between tool and borehole structure. This mud slowness may be useful for computing standoff or acoustic caliper measurements. The mud slowness also may be used as an input for other computations such as computations related to the fluid invasion effect on slowness change in a porous formation. In cases where inverted mud slowness deviates from the expected slowness at downhole pressure and temperature conditions, slowness and attenuation of the fluid-coupled mode may be a good indication of gas presence in the fluid as with Stoneley indications.

In some embodiments, the attributes of slowness inversion, together with decimated raw acoustic signal waveforms, may be displayed. Additionally, the slowness of two transmitter firings can be averaged to minimize the effects of borehole tilt angle relative to receiver array orientation. This technique is similar to BHC (borehole compensation) techniques.

In some applications, the processing of acoustic signals described above may be largely or wholly performed at the surface via surface system 72 using recorded waveforms of pitch-catch measurement data. Using the directionally measured slowness, directional formation properties, e.g. elastic modulus and porosity, can be computed. If reservoir formation properties, e.g. matrix density and pore fluid types, are known then qualitative porosity can be computed using formation slowness and/or other suitable properties. The results may be output to a display in the form of, for example, porosity charts (indicated as one of the desired output functions 50 in FIG. 2).

Figure 4:
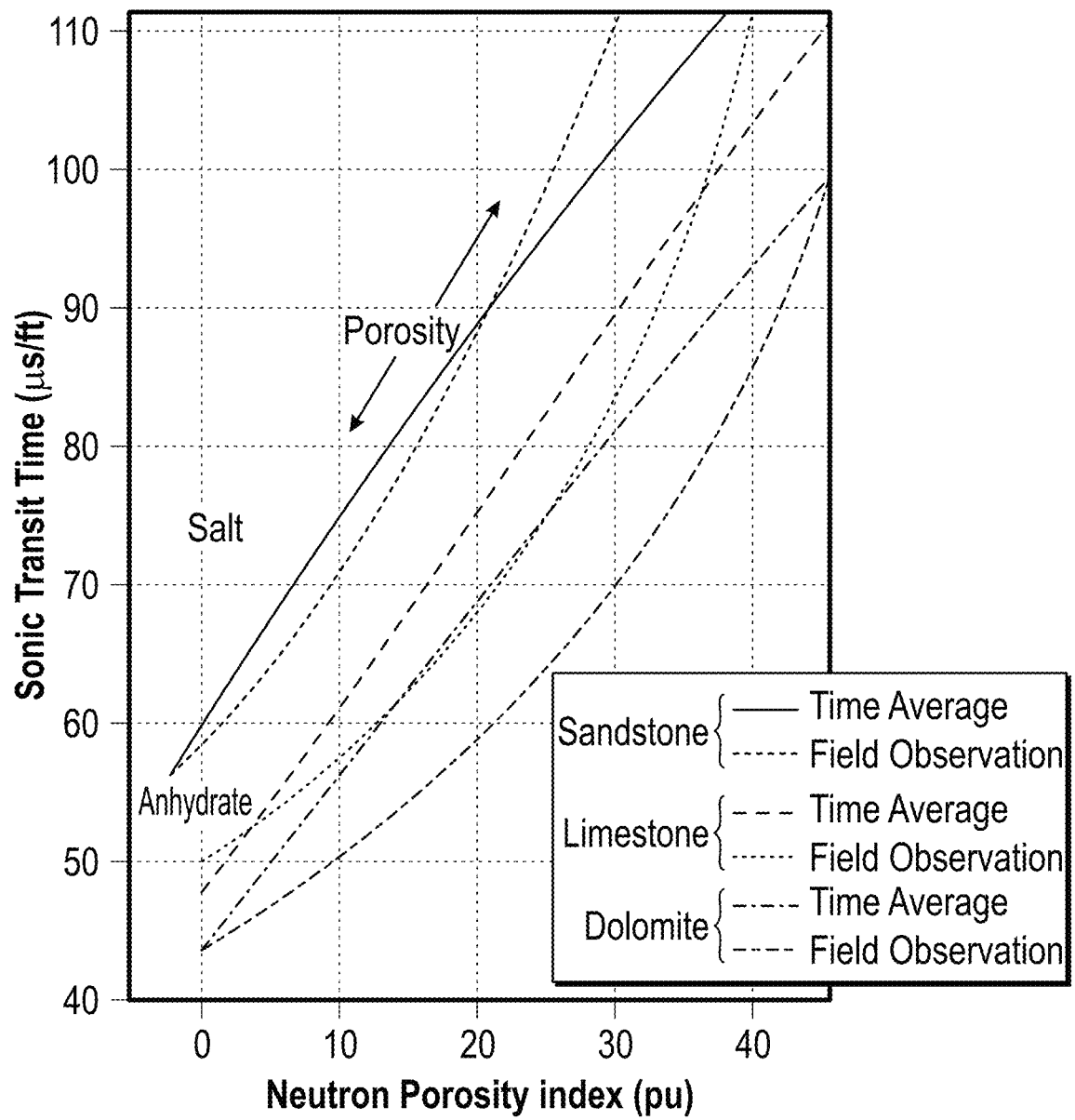
FIG. 4 is an example of an interpretation chart showing correlation between sonic transit time and neutron porosity, according to an embodiment of the disclosure.
Figure 5:
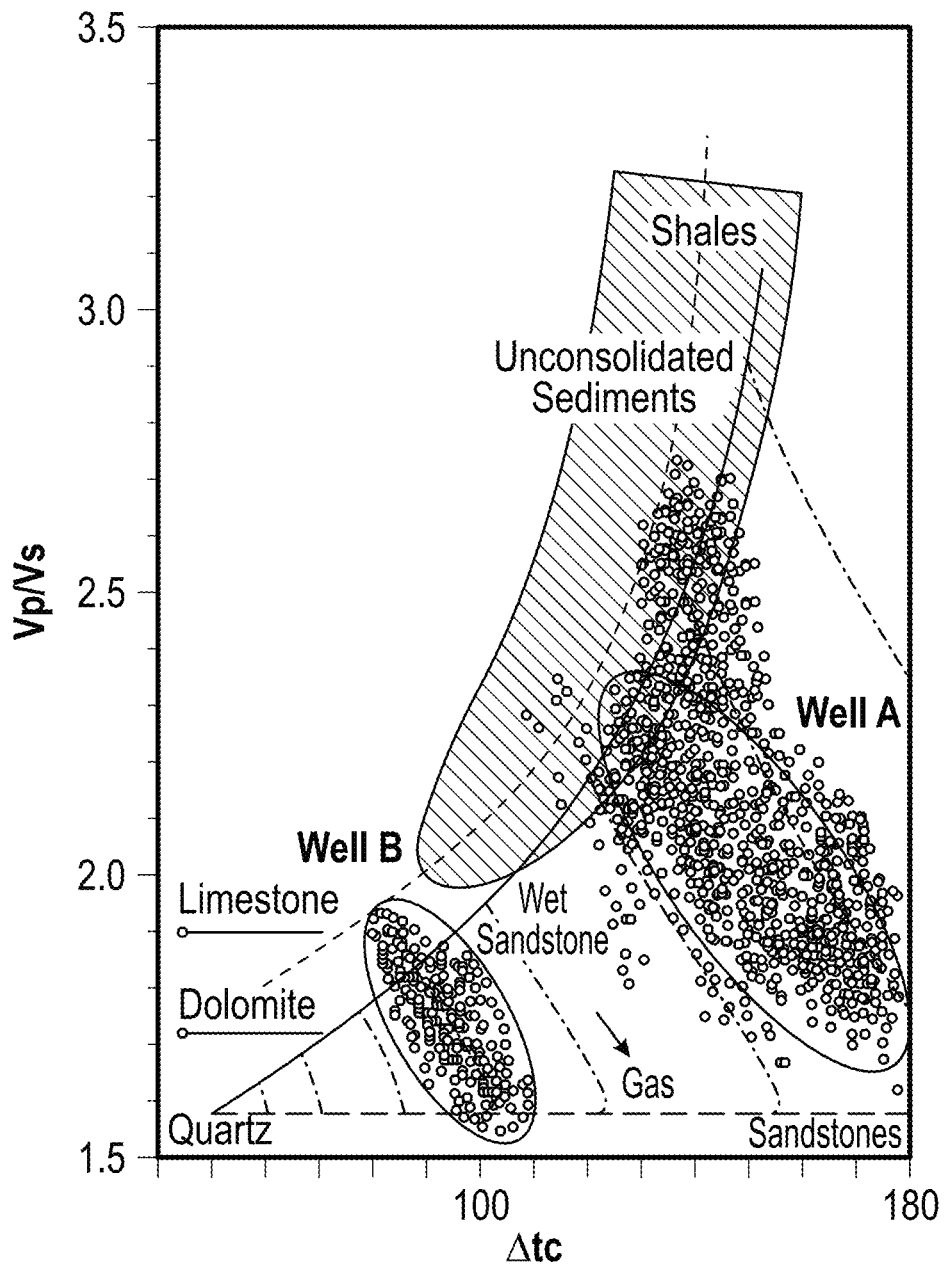
FIG. 5 is an example of an interpretation chart showing gas effect on Vp/Vs ratio, according to an embodiment of the disclosure.

It should be noted similar porosity estimates may be determined using ultrasonic signals. The use of ultrasonic signals may not provide the exact porosity but ultrasonic signals may provide an indicator reasonable enough for geo-steering purposes. The resulting data also may be output as suitable porosity charts, such as the porosity charts illustrated in FIGS. 4 and 5. It should be noted the charts illustrated in FIGS. 4 and 5 are for a sandstone reservoir but similar charts can be output for a variety of formation types. The process results can be refined based on data obtained via other platforms (e.g. see additional platforms 46 in FIG. 1). Such data also can be used to build and refine database 82 using, for example, neutron density-porosity and sonic slowness logs combined with laboratory testing of ultrasonic slowness under downhole pressures and temperatures.

Referring again to FIG. 4, the plotted example is an interpretation chart which plots the correlation between sonic transit time and neutron porosity. When a formation matrix rock type is determined, sonic slowness changes as a monotonic function of porosity. Measurements of acoustic wave propagation slowness (the reciprocal of velocity) is able to provide an indication of porosity. In FIG. 5, an example of an interpretation chart is provided which shows the gas effect on Vp/Vs ratio. The compressional and shear slowness varies as a function of porosity and material in the pores (e.g. gas, fluid, or a mixture of the two). The chart example in FIG. 5 indicates the possibility of material identification if the matrix formation properties are known.

Surface system 72 is able to utilize display module 78 for displaying porosity indicator values. The porosity values may be displayed at either a predetermined angle, e.g. top-of-hole, right, bottom-of-hole, left, or at full azimuth using curves or slowness mapped into color codes together with slowness and recorded waveforms for quality control purposes. The data displayed may be shared with geology experts or may be used with corresponding software in the display/decision module 78 to enable automatic geo-steering or to otherwise facilitate navigation in a reservoir formation.

With respect to azimuthally distributed ultrasonic pulse-echo array 32, azimuthally distributed ultrasonic pulse-echo transducers may provide borehole surface image and borehole diameter measurements, respectively, from echo amplitude and travel time of the acoustic signals. In this case, measurement principles may generally be similar to those used in commercial wireline servicing tools such as the ultrasonic borehole imager (UBI) available from Schlumberger Corporation.

Figure 6:
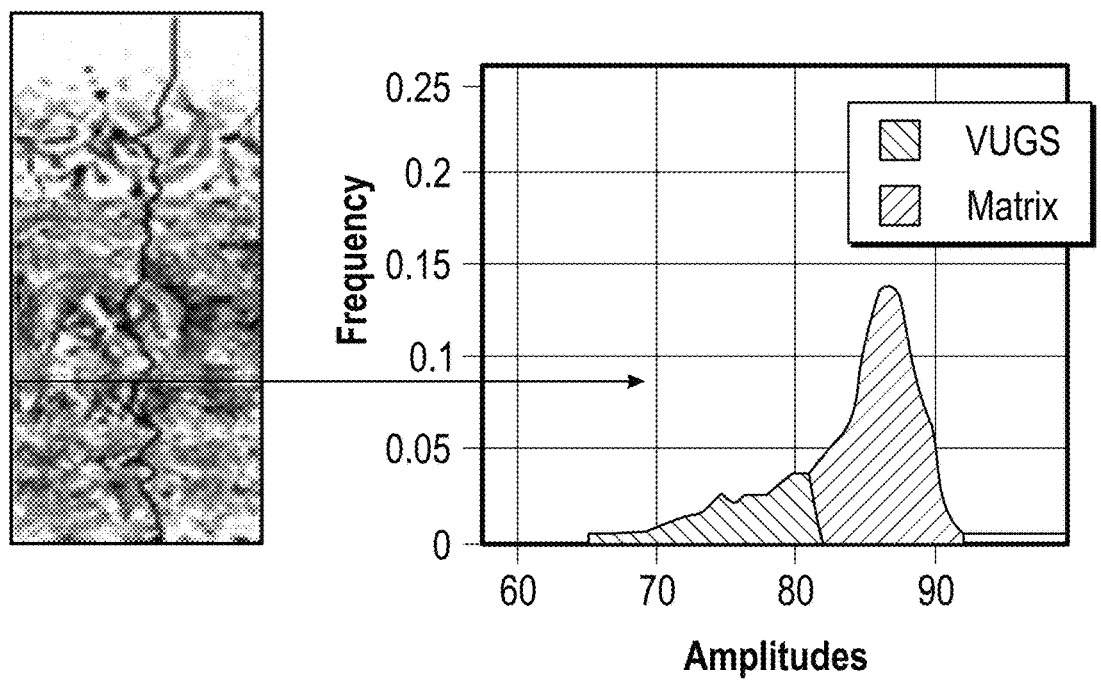
FIG. 6 is an example of a pulse-echo image of carbonate formation and its vugs indicated from a pulse-echo amplitude distribution analysis, according to an embodiment of the disclosure.

An example of a surface image combined with an amplitude histogram is provided in FIG. 6. The illustration shows textures of a carbonate formation adjacent a corresponding amplitude histogram extracted where indicated by the arrow. The graphical representation includes a lower amplitude extension which indicates a vuggy formation. For CTD tool applications, fine pulse-echo analysis can be limited when the number of azimuthal transducers or sensors is limited. However, amplitude histogram analysis may still be useful to differentiate smooth, e.g. not porous, and vuggy/porous formations.

Figure 7:
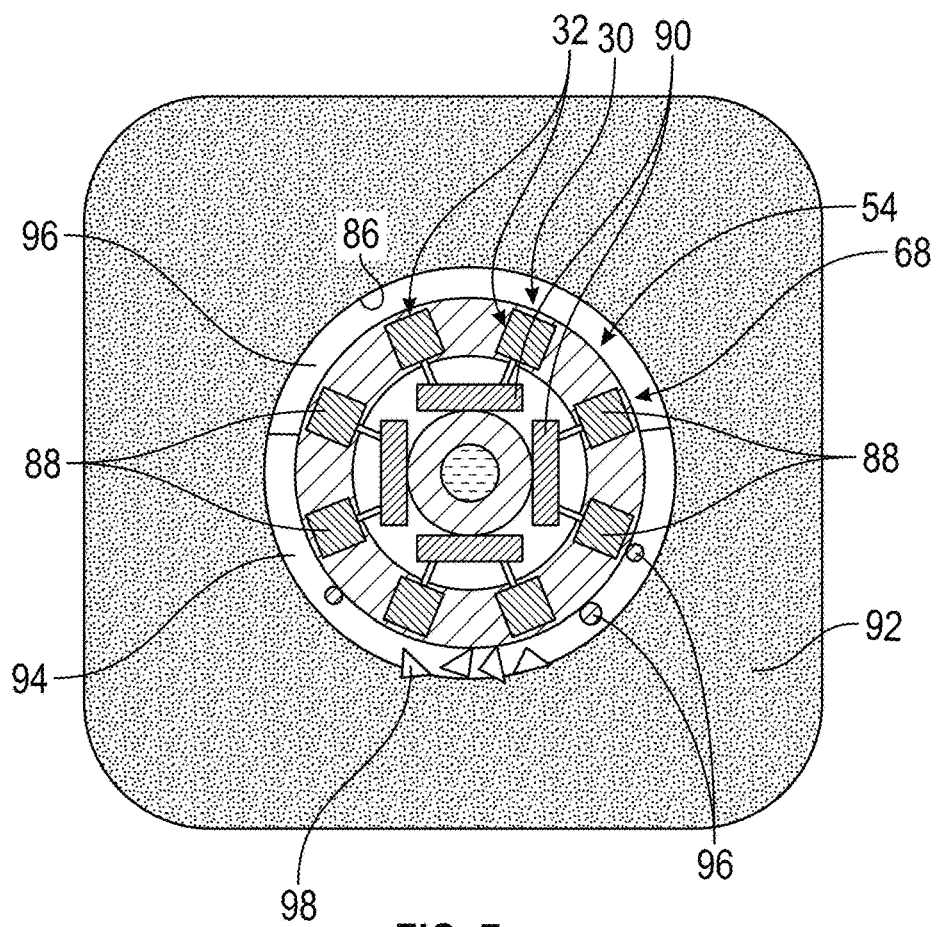
FIG. 7 is a schematic cross-sectional illustration of an example of a tool and borehole environment, according to an embodiment of the disclosure.

Referring generally to FIG. 7, an embodiment of the CTD tool 54 is illustrated as deployed in a borehole 86. In the cross-sectional illustration, the CTD tool 54 is combined with downhole sensor system 30 which includes sensor array system 32 having a plurality of the pulse-echo sensors 88 distributed azimuthally. The plurality of azimuthally distributed pulse-echo sensors 88 is coupled with corresponding downhole electronics 90 to obtain the desired data for transmission to processing system 70. In this particular example, the borehole 86 is formed in a formation 92, e.g. a carbonates formation, and contains a mixture of brine 94, gas 96, and cuttings 98.

Figure 8:
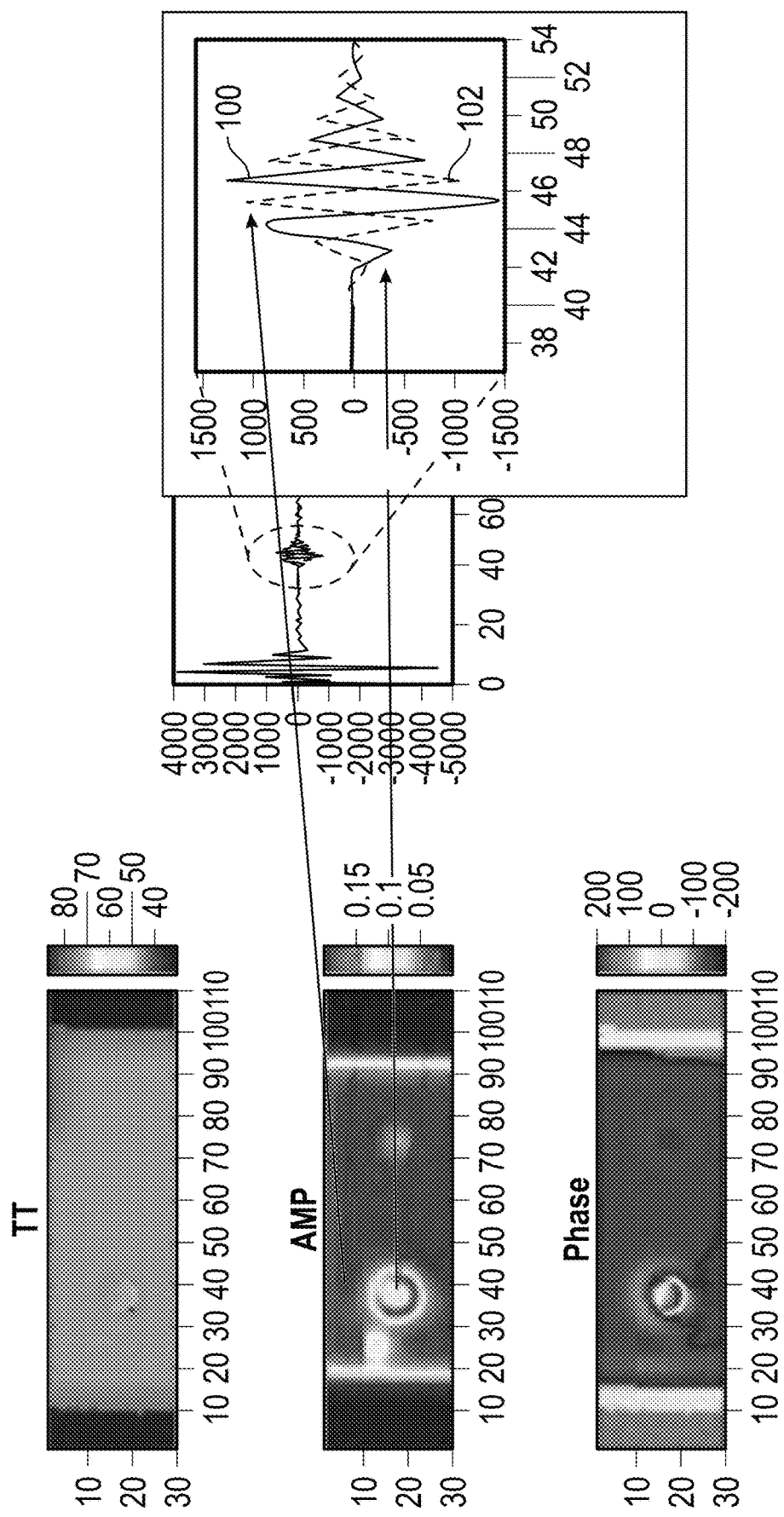
FIG. 8 is a collection of images related to pulse-echo responses to air bubbles trapped at the surface of an aluminum reflector, according to an embodiment of the disclosure.

The azimuthally distributed ultrasonic pulse-echo transducers system 32 is operated to determine borehole parameters, such as a pulse-echo image of the formation 92 and its vugs based on a pulse-echo amplitude distribution analysis. In FIG. 8, a graphical illustration is provided which illustrates the pulse-echo responses to air bubbles trapped at the surface of, for example, an aluminum reflector. Acoustic waveforms 100 resulting from the air bubbles and acoustic waveforms 102 resulting from the aluminum indicate clear phase inversion. In this example, amplitude change did not indicate a difference between the air and the aluminum so the result determined by travel time.

In the embodiment illustrated in FIG. 7, the azimuthally distributed ultrasonic pulse-echo transducers system 32 comprises a plurality of the azimuthally distributed pulse-echo sensors 88 which may be in the form of transducers. The number of transducers 88 corresponds to desired azimuthal spatial sampling. Depending on the application, the number of transducers 88 may be 4, 8, 16 or another suitable number of azimuthally spaced transducers.

By way of example, the transducers 88 may be in the form of piezo-transducer elements having tungsten-loaded backing and housed in a metallic housing or container. In other embodiments, a phased array of the transducers 88 may be mounted on a flexible board to enable full or nearly full azimuth imaging capability without tool rotation. Some of these embodiments may employ processing and storage of data downhole.

With respect to extracted attributes 38, the amplitude and travel time of the acoustic signal at echo envelope peak may be used. In some applications, amplitude and travel time as a result of a model-based parameterized packet also may be used. In addition to amplitude and travel time, the instantaneous phase angle of a reflected echo may be useful to discriminate as to whether the received echo is from a well fluid/borehole interface or a fluid/gas interface resulting from, for example, gas influx or gas in multi-phase flow. If the echo is generated at a fluid/gas interface, the phase angle tends to be nearly 180° off relative to the phase angle at the fluid/solid interface. Accordingly, this type of phase information may be used for quality control with respect to the echo signal.

According to an embodiment, pulse-echo data may be sampled via sensor/transducers 88 at a spatial resolution equivalent to the azimuthal transducer spacing along the azimuthal direction but at a relatively fine sampling resolution in the axial direction, e.g. the depth direction. By way of example, the fine sampling may be approximately 0.1 inch for a CTD tool application because the rate-of-penetration is relatively slow, e.g. in the range from 10 to 30 feet per hour. In this type of application, relatively slow data sampling taken at a per second unit could provide depth resolution better than 0.1 inch. Such resolution is close to the resolution of conventional borehole imaging. Other applications, however, may utilize other fine sampling rates, e.g. sampling rates greater or less than 0.1 inch.

The porosity indication from pulse-echo amplitude distribution data changes as a result of texture changes in the surrounding borehole surface. This correlation is applicable to image data sets without having a constraint of spatial sampling because it is a derived statistical distribution. Therefore, a fine depth sampling resolution can increase the sample data to a number appropriate for applying a statistical method. In some embodiments, rugosity or texture change can be indicated by spatial Fourier transform or discrete cosine transform (DCT) analysis of the type sometimes used for image compression.

The data (raw and/or processed) obtained via sensor array system 32 may be transmitted uphole via telemetry module 66 and cable 84, e.g. hepta cables, to enable real-time pulse-echo and slowness data transmission sufficient for real-time imaging and statistical data processing of attributes such as median average, histogram analysis, L2-norm and data regression. Appropriate software of surface system 72 may be used to perform real-time processing of such attributes and to display the appropriate characteristics 42 while drilling. The characteristics 42 and corresponding function data 50 may be used to provide geo-steering inputs for steering the CTD tool 54 or other well string tool autonomously and/or interactively.

Accordingly, the processing system 70 and surface processing system 72 may be used to perform a variety of steering and formation evaluation operations. Examples include inverting pulse-echo amplitude data to formation properties of azimuthal and depth dependent acoustic impedance and/or porosity indicators. The processing system 70, 72 also may be used to invert ultrasonic pulse-echo travel time data to caliper data that directly shows, for example, ovalization, breakouts, fracture and texture which may indirectly indicate formation properties. The processing system 70, 72 also may be used to input acoustic attributes to a database of a drilled well for combination with results provided by other types of tools and platforms to enable integration of the available data for identifying formation characteristics.

The processing system 70, 72 may further be used to invert pulse-echo instantaneous phase data into a reflector material indicator to classify attributes related to solid or gas in a formation. The processing system 70, 72 also may be used to invert statistically processed P-wave and S-wave slowness to formation porosity. The sonic porosity may be obtained by mapping measured P-wave slowness and P/S-wave slowness ratio data on a cross-plot reference chart generated from a database of model and laboratory testing regarding the formation and known porosities. In some applications, the processing system 70, 72 may be used to invert statistically processed azimuthal P-wave and S-wave slowness to provide an indication of azimuthal variation of the formation properties including anisotropy. The processing system 70, 72 may utilize statistically processed azimuthal P-wave and S-wave slowness changes as an indication regarding time-lapsed formation property alteration resulting from drilling, e.g. fluid invasion into a gas bearing formation and corresponding stressing, to enable adjustment of a drilling parameter, e.g. fluid density.

Additionally, the processing system 70, 72 may be used to display raw waveforms of pitch-catch data in a variable density log (VDL) format to qualitatively indicate fracture presence and its open/close state as a chevron pattern or refracted acoustic wave anomaly in the formation signals visualized in the VDL. The processing system 70, 72 also may utilize display capability of module 78 to present an image of pulse-echo travel time data in a time-sequence to indicate drilling tool motion or eccentricity in the borehole to enable real-time drilling dynamics monitoring and management. Various types of processed data, including the acoustic LWD tool attributes 38, 40, may be used for reservoir evaluation, reservoir management, and well placement. These are just a few examples of how the data acquired by sensors system 30 may be used for geo-steering purposes, formation evaluation purposes, and/or other purposes.

In some embodiments, real-time logs and other desired information can be displayed via monitors and shared over a network to allow experts, e.g. geologists, to remotely provide advice for steering. Additionally, the database/library 82 may be constructed with respect to slowness and pulse-echo images. Formation properties and pulse-echo images can be specific to local reservoir rocks and types of hydrocarbons. Decision-taking logic may be used to assess hydrocarbon production using slowness and pulse-echo image data sets. Accordingly, some embodiments may include building databases providing correlations between the datasets and production-ability to facilitate geo-steering decisions using databases specific to a reservoir of one region or location.

Referring generally to FIGS. 9-15, embodiments of bottom hole assembly 68 are illustrated and each embodiment utilizes the downhole sensor system 30 and corresponding processing capability, as described above, to enable geo-steering of the CTD tool 54 or other suitable tool. Examples of azimuthally and axially distributed sensors are illustrated in given numbers and spacing but other embodiments may use other sensor numbers/spacing.

Figure 9:
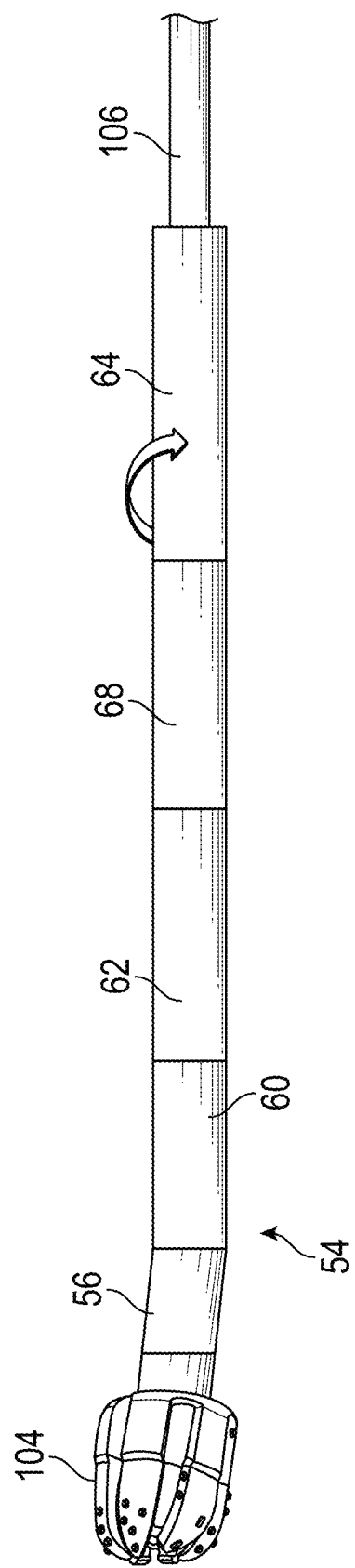
FIG. 9 is a schematic side-view of an example of a logging-while-drilling (LWD)-acoustic/ultrasonic bottom hole assembly (BHA) for geo-steering coiled tubing drilling (CTD), according to an embodiment of the disclosure.

In FIG. 9, BHA 68 is in the form of a LWD-acoustic/ultrasonic BHA which enables geo-steering of the overall CTD tool 54. In this example, the LWD-BHA 68 of CTD tool 54 is illustrated between a float sub, which may contain MWD system 62, and orienter 64. The orienter 64 and MWD system 62 may be used in cooperation to provide steering data from an orientation survey provided by the MWD system 62. The CTD tool 54 also may comprise mud motor 56 coupled with bent sub 60 and a drill bit 104. Coiled tubing 106 may be used to deploy the CTD tool 54 downhole into the borehole. In this example, the BHA 68 comprises downhole sensor system 30.

Figure 10:
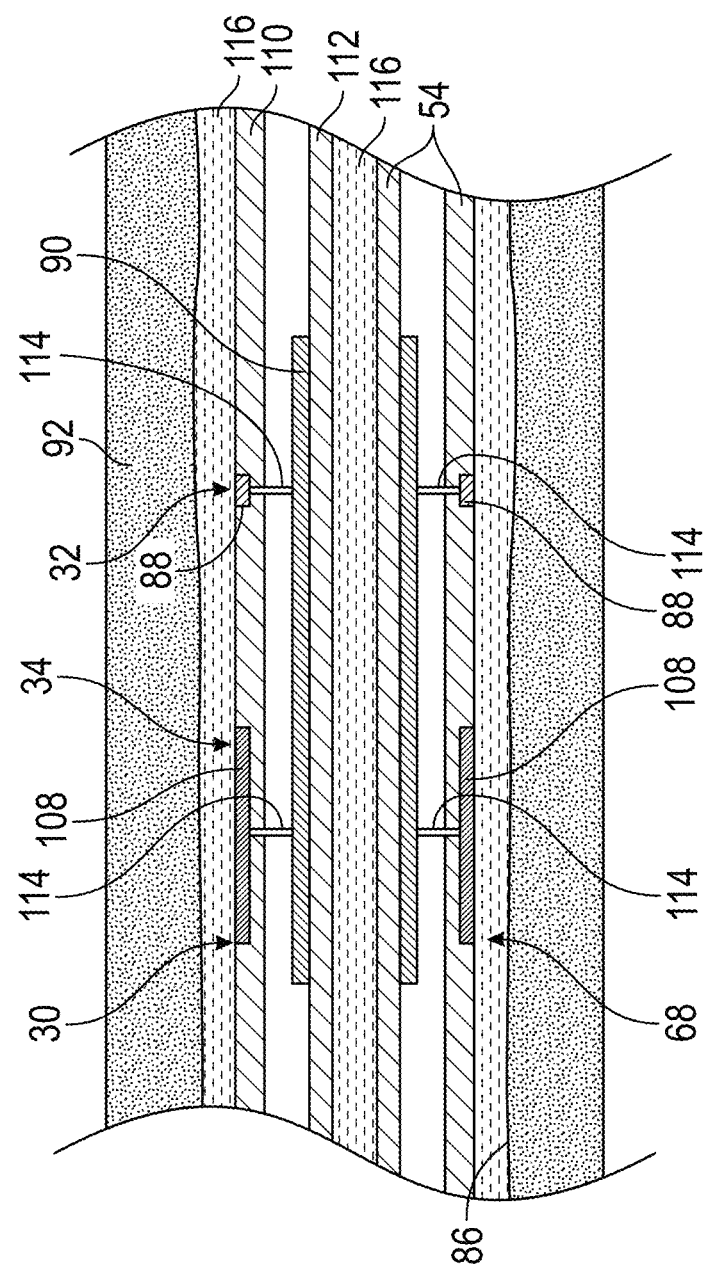
FIG. 10 is a schematic cross-sectional illustration showing an example of acoustic sensor assemblies on a CTD-BHA for geo-steering, according to an embodiment of the disclosure.

Referring generally to FIG. 10, a schematic cross-sectional illustration of BHA 68 is illustrated as deployed in the borehole 86. The BHA 68 comprises downhole sensor system 30 for enabling geo-steering of the CTD tool 54 (or other steerable tool). In this example, the downhole sensor system 30 again comprises the azimuthally distributed ultrasonic pulse-echo transducer system 32 and the azimuthally distributed pitch-catch micro-sonic sensor system 34. The illustrated system 32 comprises the plurality of azimuthally distributed sensors/transducers 88 coupled with electronics 90 and the system 34 comprises a plurality of azimuthally distributed sensors 108 also coupled with the downhole electronics 90. The pulse-echo transducers 88 and the pitch-catch sensors 108 may be mounted on an outer collar 110 of the BHA 68 and/or CTD tool 54.

The downhole electronics 90 may comprise a microprocessor or microprocessors for receiving and processing data from sensors 88, 108. In some embodiments, the downhole electronics/processors 90 also may work in cooperation with appropriate controller software for providing geo-steering inputs to the CTD tool 54, e.g. to orienter 64. By way of example, the downhole electronics 90 with the appropriate controller software may be mounted with a suitable chassis disposed in the internal annular space between outer collar 110 and an inner pipe 112. The electronics 90 may be coupled with sensors 88, 108 via appropriate cables 114 or other suitable data transfer medium.

The inner pipe 112 may be used for conducting an appropriate drilling fluid 116 to the mud motor 56 to rotate the drill bit 104. The drilling fluid 116 then flows back to the surface through an annular space between the outer collar 110 and the surrounding borehole surface of the formation 92.

Figure 11:
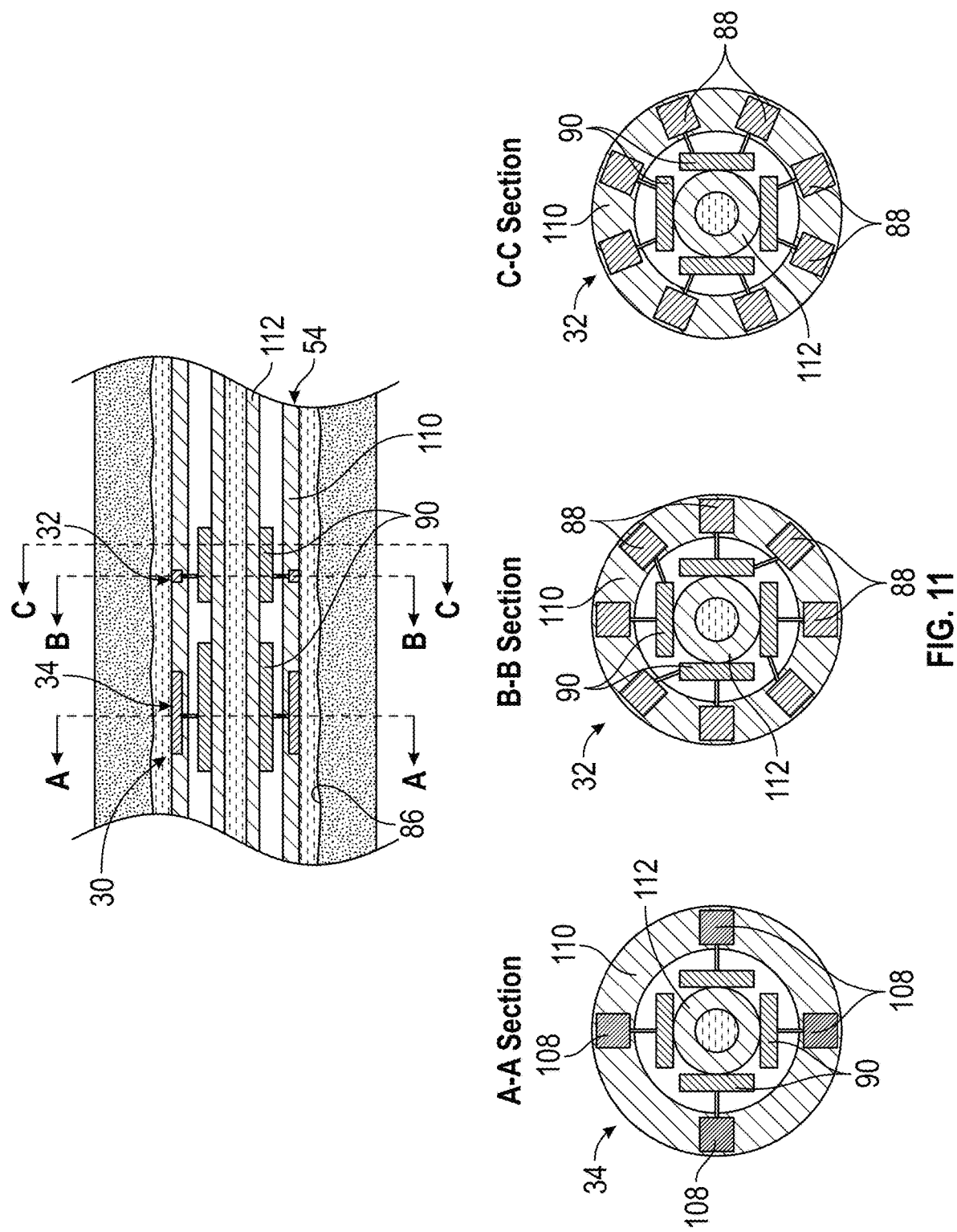
FIG. 11 is a longitudinal cross-section and an axial cross-section of an example of azimuthal mounting of pitch-catch sensors and pulse-echo transducer assemblies, according to an embodiment of the disclosure.

In FIG. 11, another embodiment of downhole sensor system 30 is illustrated in which the pitch-catch sensors 108 are mounted azimuthally and the pulse-echo transducers/sensors 88 are mounted azimuthally. By way of example, the pitch-catch sensors 108 may be mounted at every 90° (see cross-section A-A) for estimating azimuthal slowness variation. In some applications, the BHA 68 may be connected as part of the orienter 64 so that it may be slowly rotated while drilling to eventually cover the full azimuth in a horizontal or highly deviated well. Increasing the number of azimuthally arranged sensors 108 allows for azimuthal profiling with improved resolution.

In this example, 16 pulse-echo transducers 88 may be used in an eight-azimuth and two-deep array configuration as illustrated by cross-sections B-B and C-C. It should be noted the differing depth arrays may be mounted at different positions along tool 54. For imaging operations, the axial positions of the arrays of transducers 88 can be corrected by using an average rate-of-penetration and time of data acquisition. Other applications may utilize other types of mounting methods and/or numbers of transducers/sensors.

Figure 12:
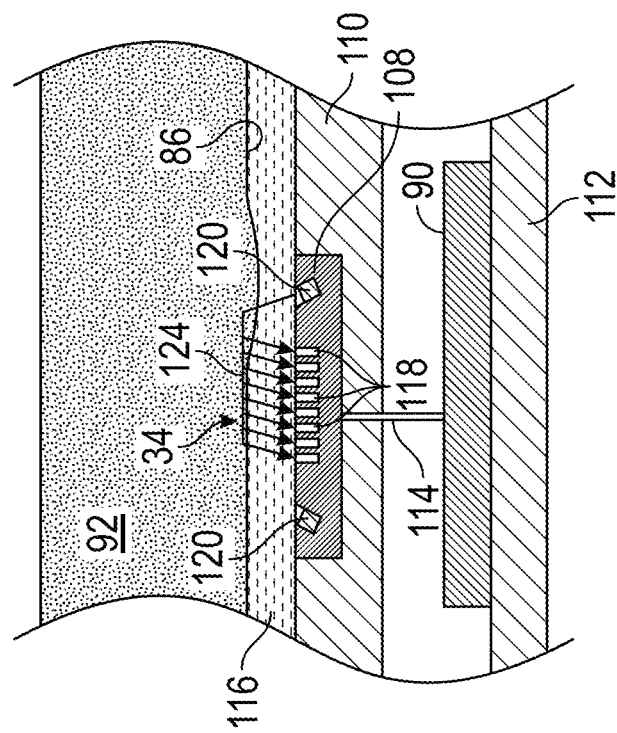
FIG. 12 provides two adjacent schematic cross-sectional illustrations showing the interactions of pitch-catch transmitters and receivers in a borehole, according to an embodiment of the disclosure.
Figure 12:
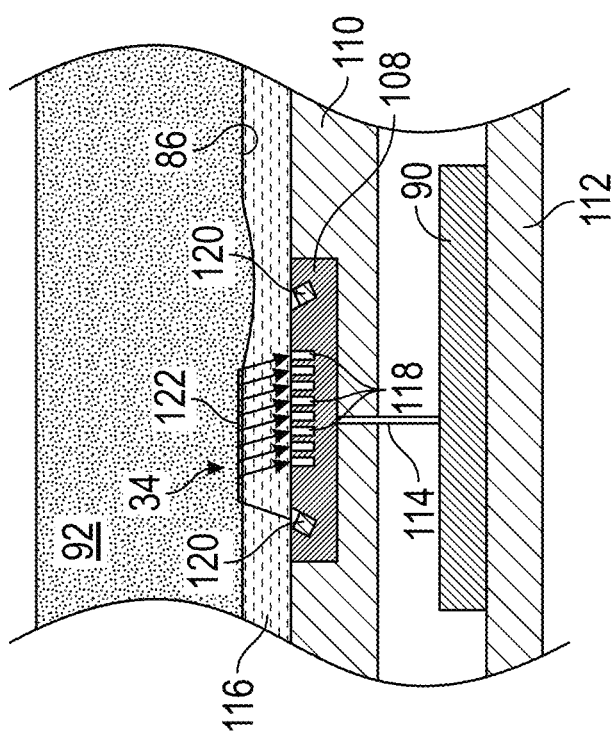

Referring generally to FIG. 12, an embodiment of downhole sensor system 30 is illustrated in which the pitch-catch sensor system 34 comprise sensors 108 which each have an array of receivers 118, e.g. 8 receivers, and at least one transmitter 120, e.g. an array of transmitters (2 transmitters in the illustrated embodiment), arranged in a desired configuration, e.g. a BHC configuration. The illustrated receivers 118 and transmitters 120 are mounted along an outside surface of outer collar 110 which, in this case, is an outer surface of CTD tool 54. Additionally, the array of receivers 118 of each sensor 108 may be positioned proximate the motor drill sub 56. It should be noted the left side of FIG. 12 illustrates a ray path 122 of the acoustic signals from the left-side transmitter 120 and the right side of FIG. 12 illustrates a ray path 124 of the acoustic signals from the right-side transmitter 120. Acoustic signals may be acquired by each sensor 108 by operating the two transmitters 120 one after another in a substantially short timeframe relative to motion of the CTD tool 54 so as to measure the same portion of the borehole surface.

When there is a borehole tilt relative to the receiver array, the difference in transit time in drilling fluid can be compensated when slowness is averaged for the left and right transmitter firings. Slowness can be computed using, for example, either an STC method for both compressional and shear signals or a first arrival detection technique for the P-wave signals.

Figure 13:
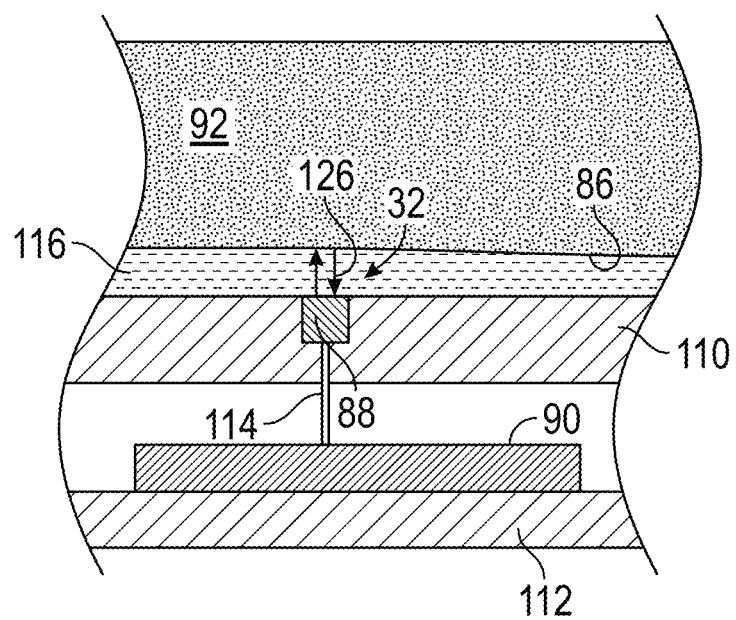
FIG. 13 is a schematic view of an example of a pulse-echo measurement, according to an embodiment of the disclosure.
Figure 14:
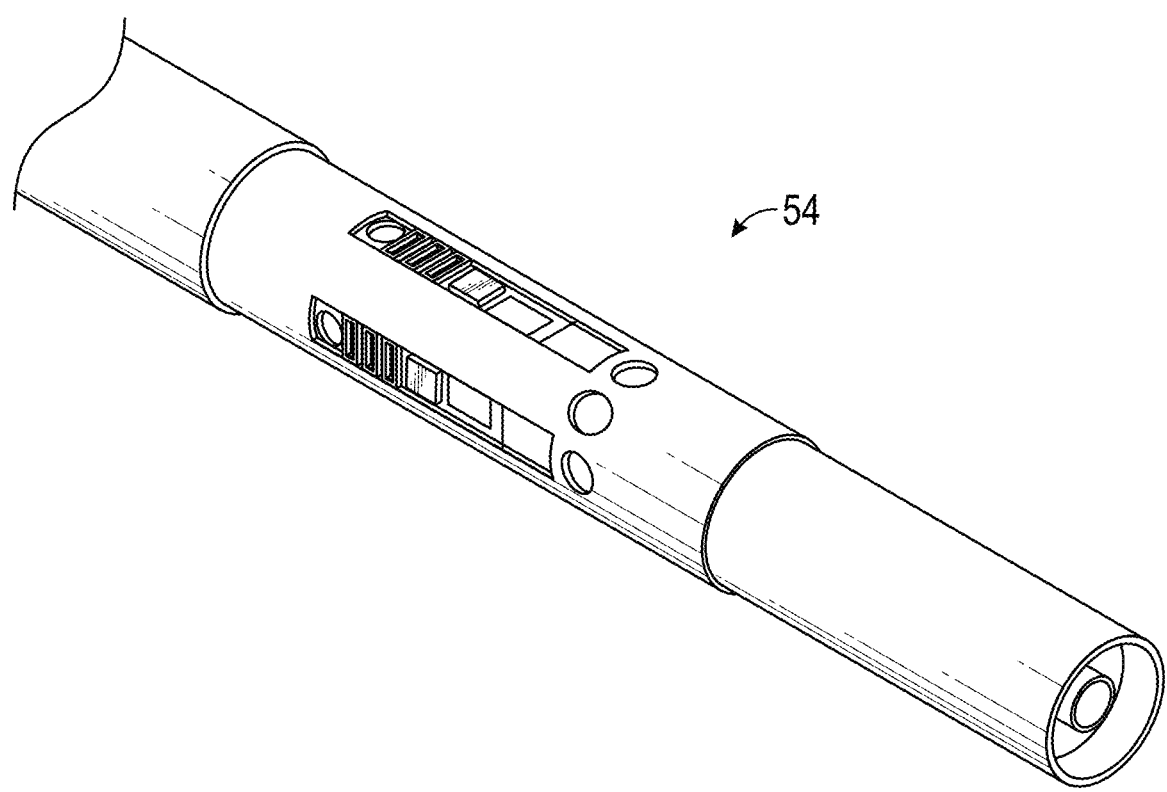
FIG. 14 is a schematic view of an example of a coiled tubing drilling apparatus (non-rotational), according to an embodiment of the disclosure.
Figure 15:
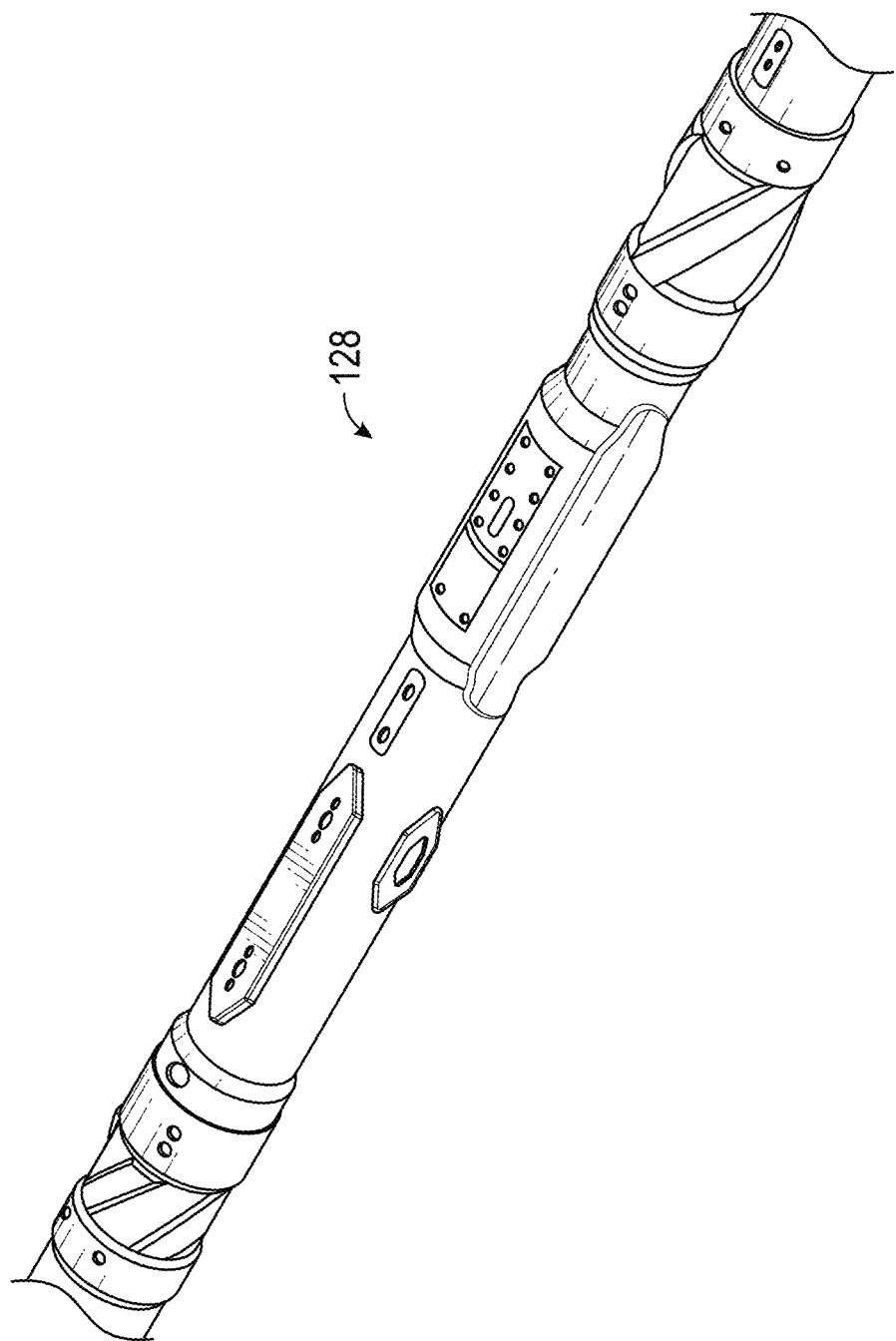
FIG. 15 is a schematic view of an example of a LWD apparatus (rotational), according to an embodiment of the disclosure.

In FIG. 13, an example of a pulse-echo signal 126 is illustrated as output and received via one of the transducers 88. Depending on the application, the pulse-echo system 32 and the pitch-catch system 34 of downhole sensor system 30 may be used with a non-rotating CTD tool 54, as illustrated in FIG. 14. However, the pulse-echo system 32 and the pitch-catch system 34 of downhole sensor system 30 also may be used during rotation of the BHA 68, e.g. during rotation of an LWD apparatus 128 as illustrated in FIG. 15.

The systems and processes described herein may be used to enable automated and/or interactive steering inputs for steering a variety of well strings such as a well string having CTD tool 54. The pulse-echo sensor systems 32 and pitch-catch sensor systems 34 may be arranged in various configurations with differing numbers of sensors depending on the parameters of a given application. Additionally, the pitch-catch sensors 108 may comprise various arrangements of transmitters and receivers. The processing of data may be conducted downhole and/or at the surface to provide geo-steering inputs for steering of the well string according to knowledge gained regarding formation and/or drilling characteristics. The steering inputs may be used to control an orienter or other type of tool steering assembly.

Although a few embodiments of the system and methodology have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for facilitating a borehole drilling operation, comprising:
    a steerable coiled tubing drilling (CTD) tool comprising:
        a motor drill sub;
        an orientor;
        a measurement while drilling module to steer the steerable CTD tool while measuring system orientation based on magnetic field and gravity;
        a telemetry module to communicate with a surface system using a communication cable;
        an acoustic logging while drilling tool comprising:
            an azimuthal pitch-catch sensor system positioned to obtain acoustic signals;
            an azimuthal pulse-echo sensor system positioned to obtain acoustic signals, wherein at least one pitch-catch sensor from the azimuthal pitch-catch sensor system is axially distributed with respect to at least one pulse-echo sensor of the pulse-echo sensor system; and
            a controller module to process the acoustic signals, to extract attributes from the acoustic signals, and to transmit the attributes to the telemetry module; and
    a surface processing system which receives acoustic signal data from the controller module, the surface processing system using the acoustic signal data to control the steerable CTD tool and to enable formation evaluation.

2. The system as recited in claim 1, wherein the azimuthal pitch-catch sensor system comprises a plurality of pitch-catch sensors, each pitch-catch sensor having two transmitters and a receiver array comprising a plurality of piezoelectric receiver elements.

3. The system as recited in claim 2, wherein the azimuthal pitch-catch sensor system comprises electronics which operate the plurality of pitch-catch sensors at ultrasonic frequency between 20 kilohertz and 1 megahertz.

4. The system as recited in claim 1, wherein the azimuthal pulse-echo sensor system comprises a plurality of pulse-echo sensors positioned at a surface of the acoustic logging while drilling tool and oriented toward a borehole surface to conduct pulse-echo measurements.

5. The system as recited in claim 4, wherein the azimuthal pulse-echo sensor system is operated in an ultrasonic frequency range between 20 kilohertz and 1 megahertz.

6. The system as recited in claim 1, wherein the controller module processes acoustic signals from the azimuthal pitch-catch sensor system and from the azimuthal pulse-echo sensor system, extracts attributes from the acoustic signals, stores the attributes downhole, and then sends the attributes together with their acquisition time and tool orientation data to the telemetry module.

7. The system as recited in claim 6, wherein attributes extracted from the azimuthal pitch-catch sensor system comprise slowness attributes, amplitude attributes and attenuation attributes of P-wave, S-wave, fluid wave and their associated acoustic modes.

8. The system as recited in claim 6, wherein attributes extracted from the azimuthal pulse-echo sensor system comprise travel time, amplitude, and instantaneous phase and frequency of each pulse-echo signal.

9. The system as recited in claim 1, wherein the acoustic logging while drilling tool is used for formation evaluation and for real-time geo-steering.

10. The system as recited in claim 1, wherein the surface processing system receives pitch-catch attributes and pulse-echo attributes as input data and then inverts the input data to provide formation and borehole attributes.

11. The system as recited in claim 10, wherein the surface processing system inverts pulse-echo amplitude data to formation properties of azimuthal and depth dependent acoustic impedance and porosity indicators.

12. The system as recited in claim 10, wherein the surface processing system inverts ultrasonic pulse-echo travel time data to caliper data used to indirectly indicate a formation property.

13. The system as recited in claim 10, wherein the surface processing system inputs acoustic attributes to a database related to a drilled well for comparison with data accumulated from other tools.

14. The system as recited in claim 10, wherein the surface processing system inverts pulse-echo instantaneous phase data to provide a reflector material indicator.

15. The system as recited in claim 10, wherein the surface processing system inverts statistically processed P-wave and S-wave slowness data to formation porosity.

16. The system as recited in claim 10, wherein the surface processing system inverts statistically processed azimuthal P-wave and S-wave slowness to determine azimuthal variation of formation properties.

17. The system as recited in claim 10, wherein the surface processing system utilizes statistically processed azimuthal P-wave and S-wave slowness change data to indicate time-lapsed formation property alteration resulting from drilling.

18. The system as recited in claim 10, wherein the surface processing system displays raw waveforms of pitch-catch data in a variable density log (VDL) format to qualitatively indicate fracture presence.

19. The system as recited in claim 10, wherein the surface processing system displays drilling tool motion using pulse-echo travel time data in a time sequence.

20. The system as recited in claim 19, wherein the surface processing system is used to process data for reservoir evaluation and well placement determination.

* * * * *